United States Patent [19]

Killian

[11] 4,259,630

[45] Mar. 31, 1981

[54] AC MOTOR CONTROLLER

[75] Inventor: Jimmie W. Killian, Niantic, Conn.

[73] Assignee: The United States of America as represented by the Secretary of the Navy, Washington, D.C.

[21] Appl. No.: 958,462

[22] Filed: Nov. 6, 1978

[51] Int. Cl.³ .......................... H02P 5/28; H02P 3/18; H03K 17/56; H02M 1/12

[52] U.S. Cl. ................................... 318/807; 318/812; 363/41; 307/241

[58] Field of Search ...................... 318/807, 809, 812; 363/41, 39, 42; 307/241, 252 Q

[56] References Cited

U.S. PATENT DOCUMENTS

| | | | |
|---|---|---|---|
| 3,207,974 | 9/1965 | McMurray | 307/305 |
| 3,777,250 | 12/1973 | Kaeser et al. | 321/9 R |
| 3,832,624 | 8/1974 | Gilmore et al. | 321/66 |
| 4,047,083 | 9/1977 | Plunkett | 318/807 |
| 4,123,692 | 10/1978 | Gilmore et al. | 363/41 |
| 4,128,793 | 12/1978 | Stich | 318/808 |

Primary Examiner—J. V. Truhe
Assistant Examiner—John B. Conklin
Attorney, Agent, or Firm—R. S. Sciascia; P. C. Lall

[57] ABSTRACT

A controller for achieving quiet operation of an AC motor utilizes an arrangement of force-commutated, controlled rectifiers that are gated in a manner that results in the motor windings being energized with a preselected number of adjustable width, current pulses during each half cycle of the power supply. In the interval between pulses the motor winding is short circuited so that the motor current remains continuous upon commutation between the "on" and "off" states. The number of pulses are selected so as to reduce those magnetic field stress harmonics that are responsible for the excitation of vibration and noise.

9 Claims, 1 Drawing Figure

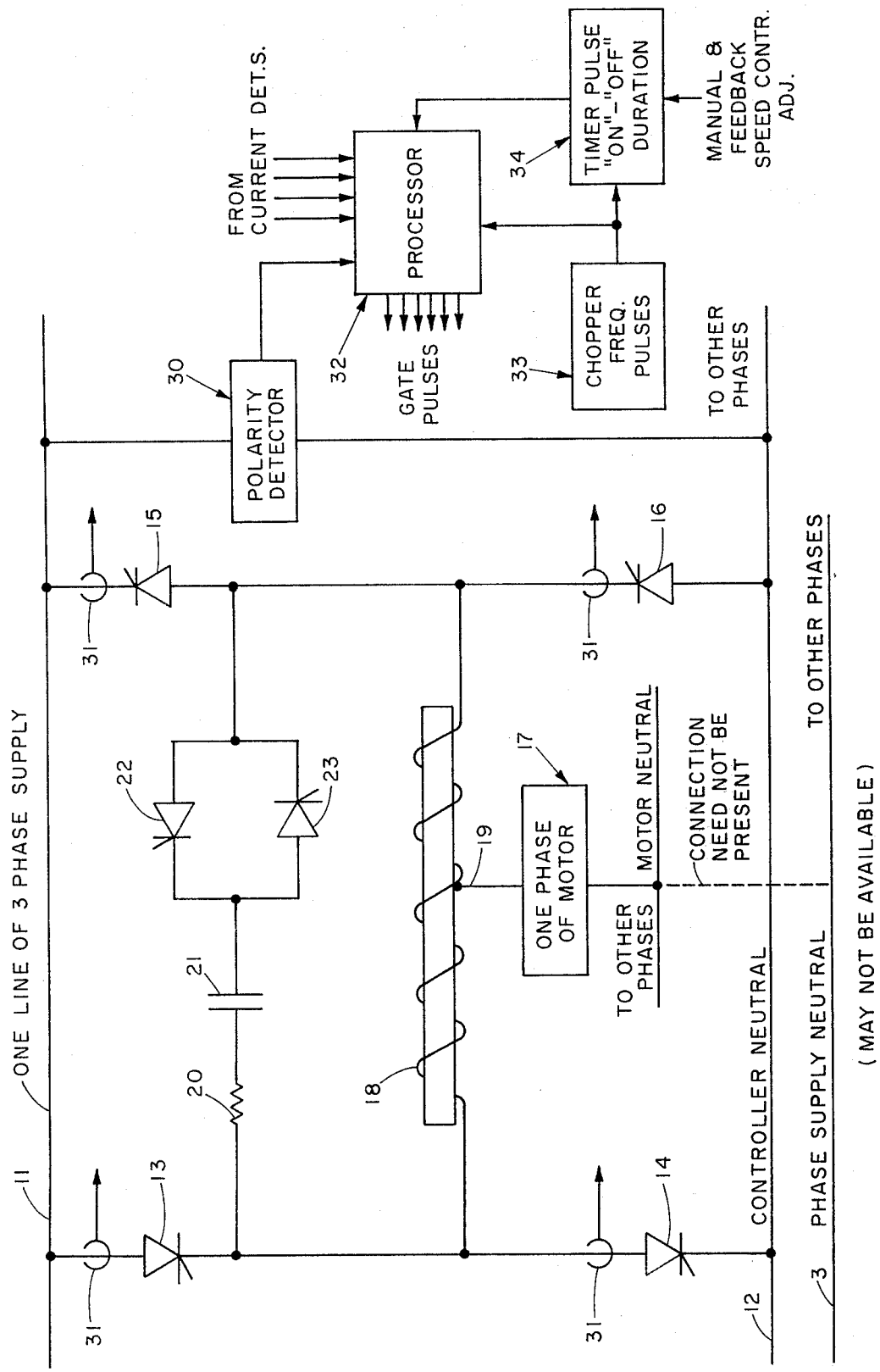

AC MOTOR CONTROLLER

The present invention relates generally to AC motor controllers and, more particularly, to a controlled rectifier arrangement for regulating the operation of AC motors which minimizes motor vibration and noise.

Most electronic motor controllers currently in use develop energizing waveforms that contain various harmonics of the voltage supply frequency. These waveform distortions result in similar irregularities in the motor's magnetic fields and, thus, produce vibratory torque components and structural flexing stresses. Both of these conditions cause considerable motor vibration and the attendant radiation of a significant amount of noise.

The mechanical disturbances can be caused by distortions in the energizing waveform involving the 5th and 7th harmonics of the currents supplied to the motor by the controller from the AC energizing source. By interacting with the fundamental frequency, these current harmonics produce 6th harmonic magnetic field stresses which then excite 6th harmonic mechanical vibrations which are a main source of undesirable motor performance. If the waveform distortions produced by the controller are displaced to higher frequencies, the accompanying disturbances can be more easily suppressed by mechanical equipment. Higher harmonics can also be more readily eliminated by electrical filtering.

One common electronic arrangement now in use employs controlled rectifiers as current switch elements, and the conduction of these rectifiers is regulated so that the motor current is effectively turned "off" for a fraction of each half cycle of the voltage supply. Self-commutation or extinction of the rectifying devices occurs when the current from the energizing source tries to reverse.

In the case of three-phase systems, the equal ignition delay for each phase results in different ignition times of the rectifiers for each phase, and this irregularity introduces current imbalances in the system, especially where there is no neutral return connection between the three-phase motor and the power supply. The interruption of the phase current in one motor winding then produces changes in the other phase currents, and, the zero-phase sequence imbalance that would normally flow in a neutral return connection is not present. If present, a zero phase sequence set of currents would produce no torque in either direction. The imbalance in the phase currents then appears only as a negative sequence set which tends to develop opposition motor torques that cancel a significant portion of the desired torque.

Some controlled rectifier arrangements employ of mode of operation which involves periodically interrupting the motor current. The motor inductance resists these interruptions, converting them into voltage excursions which further aggravate waveform distortion. Electrical filter techniques do not provide a practical solution to this distortion mainly because of the power levels encountered and the comparatively low frequencies involved. Thus, with most electronic controls, the various vibrations and noises encountered must be suppressed mechanically by, for example, a decoupling process or by shifting the mechanical resonances away from the exciting frequencies and utilizing various damping mechanisms.

It is, accordingly, an object of the present invention to provide an AC motor control wherein the phase windings of the motor are effectively disconnected from the power source for several intervals during each half cycle of the voltage supply frequency for speed control and also so as to reduce motor vibration and noise.

Another object of the present invention is to provide a controlled rectifier arrangement for regulating AC motors wherein the "off" condition of the motor is obtained by forcing the motor voltage rather than the motor current to zero.

Another object of the present invention is to provide an AC motor controller having a chopper that employs controlled rectifiers whose forced commutation also establishes short-circuit diversion paths for the motor currents.

Another object of the present invention is to provide an AC motor control arrangement wherein the motor inductance produces a current smoothing effect which reduces motor vibrations and noise.

Another object of the present invention is to provide an electronic motor controller wherein controlled rectifiers are utilized as current switching devices which establish a multiplicity of "on" and "off" energization periods of adjustable relative length during each half cycle of the voltage supply.

Briefly, and in somewhat general terms, the above objects of invention are accomplished by an arrangement of controlled rectifiers, an autotransformer and a commutating capacitor that operate in one mode to direct current through the motor winding in a first or opposite direction depending upon the polarity of the motor current during an "on" period and in a second mode to effectively short-circuit the motor so that the voltage across it is forced to zero during an "off" period. By reducing the voltage rather than the motor current to zero, the motor current remains continuous upon commutation between the "on" and "off" states. The motor's inductance contributes to the reduction of the harmonic amplitudes of the motor currents.

Each of the controlled rectifiers is usually force-commutated, and a voltage produced across the commutating capacitor during each commutation assists the "on" and "off" switching operations. This switching is smooth, and a minimum of waveform distortion is introduced into the motor current by this action. As a consequence, magnetic field stress harmonics are reduced, minimizing the excitation of vibrations and noise.

The chopping frequency established by the present motor controller is such that a multiplicity of "off" and "on" intervals occurs during each half cycle of the voltage supply frequency. It is well known that an n-th harmonic chopping frequency will introduce harmonics of an order of one less or one more than an integer multiple of n. To preserve symmetry with respect to conduction direction, n must be an even number, which tends to suppress even harmonics in the waveform. For the three motor phases, symmetric triplication will tend to suppress triplen harmonics. Thus, the lowest order harmonics still of concern are the 5th and 7th mentioned hereinabove. To suppress these harmonics as well as even and triplen harmonics, the chopping harmonic, n, is made at least equal to 10, with higher even values also appropriate. An even triplen harmonic for n such as 12, 18, 24 will switch all phases of the motor "on" or "off" simultaneously maintaining phase current balance, in spite of harmonic distortions from the switching and permitting the use of the same timing signals for all three phases.

Referring to the drawing, the single FIGURE illustrates the controller of the present invention associated with one winding of a three phase motor.

Conductor 11 is one line of a conventional three phase WYE power supply, while line 12 is the controller neutral, line 10 is the motor neutral, and line 3 is the power supply neutral. A first pair of controller rectifiers 13 and 14 are connected in series across lines 11 and 12. More specifically, the anode of rectifier 13 is connected to conductor 11 while its cathode is connected to the anode of rectifier 14, the cathode of which is connected to line 12. A second series pair of controlled rectifiers 15 and 16 are also connected across lines 11 and 12 but in an opposite manner, that is, the cathode of rectifier 15 is connected to line 11, the anode of this rectifier is connected to the cathode of rectifier 16 and the anode of the latter is connected to line 12. As will be seen hereafter, rectifier 13 performs as the "on" switch and rectifier 16, the "off" switch for one direction of current flow through the motor winding 17, while rectifier 15 performs as the "on" switch and rectifier 14, the "off" switch for an opposite direction of current flow through this winding.

Connected between the junction of rectifiers 13 and 14 and the junction of rectifiers 15 and 16 is an autotransformer 18 which is center tapped at 19. Motor winding 17 is connected at one end to center tap 19 and the other end to the other phase windings of the motor. It also can be connected, if available, to the neutral line 12 of the controller which may also be connected to the neutral line of the three phase power supply, if present. If these neutrals are not connected, balanced currents return through the other phases to the other lines. Only zero sequence imbalances will flow in the connections between the power supply neutral, the controller neutral, and the system neutral, if such connections are present.

Between the above two junctions is a circuit consisting of the effective series resistance 20 with the capacitance of a commutating capacitor 21, and this RC circuit is in series with the parallel combination of oppositely poled controlled rectifiers 22 and 23.

Connected across lines 11 and 12 is a polarity detector 30 for determining the polarity of the voltage existing between these lines at any particular time. And in order to determine which of the controlled rectifiers, 13, 14, 15 and 16 are conducting at any particular time, current detectors 31 are employed to sense the current condition in the various lines that contain these rectifiers. Thus, for example a current detector may be associated with the anode circuit of rectifier 13, the cathode circuit of rectifier 15, the anode circuit of rectifier 14, and the cathode circuit of rectifier 16. The outputs of the polarity detector and the current detectors are sent to a processor 32 which also has supplied to it timing pulses from a chopper frequency generator 33 and, at an adjustable time thereafter, timing pulses from an appropriate timer or clock 34. These timing pulses establish the time of commutation switching. Processor 32, which may operate either with digital or analogue information, analyzes the signals derived from polarity detector 30 and the current detectors 31 and establishes the gating sequence of rectifiers 13, 14, 15, 16, 22, and 23. It also provides the necessary gating pulses for these rectifiers.

Processor 32 also determines from the various inputs supplied to it whether or not commutating capacitor 21 needs auxiliary charging and when this is necessary, it provides gating pulses to other controlled rectifiers, not shown, which connect a suitable auxiliary charging source to this capacitor. Since this charging is rapidly accomplished, the controlled rectifiers which are involved in this process thereafter quickly self-extinguish and disconnect the auxiliary charging source from the control system.

Polarity detector 30, in one embodiment of the invention, was a small transformer feeding a rectifier and a clipping circuit, which together generated a square wave pulse over one half cycle of the voltage that vanished over the other half cycle. The current detector included a pair of small magnetic amplifier cores which were threaded by the conductor whose current condition was being sensed. Each core was excited oppositely with an over-saturating 1 MHZ bias current. Associated with each core was a rectifier and a load resistor. When a current condition was sensed, the two cores were no longer saturated in the same way with the bias current and an unbalanced signal was produced. This arrangement with its inherent transformer action isolates the power voltages being switched by the controlled rectifiers from the detector circuitry.

The gating of controlled rectifiers 22 or 23 determine the desired direction of current flow and the time when the commutation capacitor is effective to help switch the "on" controlled rectifier 13 to a non-conducting condition when the line voltage favors the conduction of this rectifier and, the other "on" controlled rectifier 15 to a similar non-conducting status when the line voltage in its other half cycle favors the conduction of this rectifier, and at the same time to force the conduction of controlled rectifier 16 or 14 respectively, when also gated, although opposed by the line voltage, to complete an opposed "off" commutation; and similarly vice versa for an opposed "on" commutation.

Autotransformer 18 is a high frequency transformer, and should have a 60 Hz impedance that is low compared to that of the motor. A high saturating core is not required since the transformer need only exhibit a high impedance at the frequency where transformer action and induction is utilized.

In the operation of the above-described circuit, the initial temporary commutation occurs in about 1 microsec., and it is limited primarily by the switching speeds of the controlled rectifiers. An additional delay in completing the commutation is introduced as a result of the time for a partial oscillation of inductance of autotransformer 18 with the commutating capacitor 21.

In the operation of the controller, about half of the commutations are favored by the polarity of the line voltage. The others which are either opposed, or neither favored nor opposed, consequently, must be driven against the usual opposition of the line voltage. To achieve this, commutation capacitor 21 has to be charged to the proper polarity and to a voltage level higher than that of the opposing line voltage.

In order to explain the operation of the controller, consider a favored commutation condition with line 11 positive with respect to line 12, with motor current flowing through motor winding 17 towards the neutral and circulating in a short-circuit path made up of controlled rectifier 16 and the right-hand winding of autotransformer 18. Further assume that commutation capacitor 21 is either discharged or charged to a voltage level which aids the line voltage in driving the commutation current. With these conditions obtaining, if a gating signal is now applied to rectifiers 13 and 23, an initial commutation will occur with the current rapidly increasing in rectifier 13 and rapidly decreasing in controlled rectifier 16 to zero. The combined voltages, that is the line voltage plus the aiding voltage across the commutation capacitor 21, now will provide the necessary reverse opposing voltage for the required safe turn-off time to keep rectifier 16 turned off.

Once rectifier 16 is shut off and before any substantial change occurs in the current flowing through the autotransformer, motor current flows essentially from the line through rectifier 13, capacitor 21, rectifier 23, the right-hand winding of transformer 18, the motor winding 17 to the motor neutral, then through other motor phases and controller phases, to conductor 12 or directly to 12 if connected to the motor neutral. During this initial portion of the commutation, the parallel LC circuit composed of commutation capacitor 21 and autotransformer 18 is effectively clamped by the voltage occurring across the line to neutral. Thus, this LC combination cannot oscillate. However, as soon as controlled rectifier 16 is shut off and the clamping voltage removed, oscillation can start to take place. In one embodiment of the controller, this oscillation was adjusted to occur in the 20 to 25 KHz range.

The commutation current which originally flowed through capacitor 21 is now transferred to the windings of autotransformer 18. Capacitor 21, therefore, does not discharge only to zero voltage, and the commutating current continues to be available as a result of the oscillation. Consequently, capacitor 21 is resonantly charged back towards the positive line voltage storing not only the oscillation energy less losses but also some of the short-circuit current which was flowing from the power line through rectifiers 16 and 13 before rectifier 16 was extinguished. It should be noted that this stored energy may be sufficient to raise the voltage level across capacitor 21 to a value sufficient for the following opposed commutation which next results in the extinguishing of rectifier 13. However, if this is not the case, additional commutation energy may be supplied to 21 from an external source.

The above oscillation cannot continue beyond the time that the current flowing through capacitor 21 decreases to zero since controlled rectifier 23 will then self-extinguish. This, of course, stops the oscillation and completes the commutation process. Motor current will then flow from the line through "on" rectifier 13, the left-hand winding of autotransformer 18, motor winding 17 to the neutral, duplicating the direction of current flow through motor winding 17 in the previous "off" period.

With the same direction of motor current flowing and the same line voltage polarity, the next "off" switching commutation occurs when rectifiers 16 and 22 are gated. Capacitor 21, which has previously been charged to a voltage level above that of the line voltage, now has a polarity that opposes continued conduction through rectififer 13, and, hence, the current through it now rapidly decreases towards zero while the reverse current condition occurs within rectifier 16. While both rectifiers 13 and 16 are conducting during the initial commutating period, the LC circuit is clamped and no oscillations are present in the circuit. However, once rectifier 13 is extinguished, the oscillation proceeds as before, discharging capacitor 21 and transferring the initial commutation current to autotransformer winding 18. Again, as the commutating current drops to zero and tries to reverse, rectifier 22 self-extinguishes, terminating the oscillation and completing the commutation. The "off" period is restored with capacitor 21 now charged to aid the line voltage in extinguishing rectifier 16 for the next "on" period.

During the above sequence of events, rectifier 13 will be extinguished even though the reverse potential applied thereto by commutation capacitor 21 drops, provided it still remains above the line voltage for the short time interval until this rectifier is safely off. Thereafer, rectifier 13 can withstand the forward potential of the line voltage without spontaneously reigniting. Besides forcing the extinction of rectifier 13, the commutating current provided by capacitor 21 must also provide any build-up of current in autotransformer 18. While it is possible that rectifier 16 may be extinguished, this is unlikely since the motor inductance tends to keep the motor current flowing provided the motor current is not at a low value and at a point where it is ready to reverse.

If the power supply energizing the motor were of a DC nature, the above pulse width modulation could then continue indefinitely. However, with AC energization used in the present case as the voltage reverses in direction, a condition which usually occurs before the current reverses, the previous "on" switchings now become opposed while the "off" switchings are favored. This change is detected and utilized to alter the manner in which commutation capacitor 21 is charged to again assist the opposed commutations. As the motor current reverses, it will be appreciated, neither rectifier 13 nor rectifier 16 can carry the motor current, and, consequently, the operation of the controller must effectively shift from this pair of rectifiers to rectifiers 14 and 15. Rectifier 15 now becomes the "on" switch with current flowing from the neutral or line 12 up through motor winding 17, the righ-hand winding of autotransformer 18, rectifier 15 to line 11. During the "off" period, when rectifier 15 is extinguished and rectifier 14 rendered fully conducting, the motor current circulates in the same direction but through the short-circuit path made up of the left-hand winding of transformer 18 and rectifier 14.

To switch the controller from an "off" to an "on" mode, rectifiers 15 and 23 must be gated, and to achieve the opposite condition, rectifiers 14 and 22 must be gated.

The required gating of the various rectifiers 13, 14, 15 and 16 is accomplished, as briefly mentioned hereinbefore, by employing a polarity detector 30 to sense the voltage sign between lines 11 and 12 and a plurality of current detectors 31 to sense the presence of any conduction current in each of these rectifiers. This information, which may be converted to digital form by conventional equipment, is made available to processor 32, which also receives chopper frequency timing pulses from generator 33 and, after an adjustable time interval equal to the desired "on" or "off" period, other timing pulses from timer 34. At each commutation time, as determined by timers 33 and 34, processor 32 interprets the data supplied to it from detectors 30 and 31 and establishes the appropirate gating sequence. Additionally it also provides the gating pulses, with any appropriate desired delay times. As indicated hereinbefore, during one polarity condition of the AC current, rectifiers 13 and 23 are gated simultaneously for an "on"

commutation and, thereafter, rectifiers 16 and 22 for an "off" commutation. When the current polarity changes, rectifiers 15 and 23 are then gated simultaneously for an "on" commutation and, thereafter, rectifiers 14 and 22 for an "off" commutation.

If there is an excess of current above that required for the commutation process present in the autotransformer at a time in the cycle when the current through the commutation capacitor ceases, it may be desirable to provide the equivalent of a free-wheeling diode to accommodate it. Near the time of motor current reversal, such an extra current could be drawn on, for the motor current in the opposite direction, until the end of that particular "on" or "off" interval. This mode of operation may be achieved by rendering both "on" control rectifiers 13 and 15 or both "off" controlled rectifiers 14 and 16 conducting at the same time. The current that would then flow through both rectifiers would be in the nature of a free-wheeling diode current, with their difference supplying the motor current and continuing to do so even if the motor current reverses.

This procedure requires a double commutation which must be performed in the proper order depending on the condition of the line voltage to avoid a direct short-circuit across the voltage supply lines. Consequently, any simultaneous conduction of rectifiers 13 and 14 when line 11 is at a positive voltage with respect to the neutral or of rectifiers 15 and 16 when the reverse polarity obtains, must be avoided. Thus, for example, if the line voltage is positive and an "on" condition exists with both rectifiers 13 and 15 conducting, an opposed commutation must first occur, extinguishing rectifier 13 before igniting rectifier 14, for any excess current in the autotransformer to circulate. Once rectifier 13 is extinguished, the line voltage condition will then tend to reduce any current in rectifiers 15 and 16, extinguishing the one with the lower value. The gating of rectifiers 14 and 16 will then assist the favored extinction of rectifier 15 if it is not already extinguished and if necessary reignite rectifier 16 to short-circuit the motor regardless of the direction of flow of the motor current. This will result in the circulation of some current through rectifiers 14 and 16 and autotransformer 18, which will fairly rapidly decay due to the resistance of the transformer, slowed somewhat by its inductance, in an R,L transient.

It should be appreciated that each phase winding of the motor requires an arrangement similar to that above described. However, a single processor can serve the complete control system and the same may be true with respect to the timers which produce the various timing pulses.

What is claimed is:

1. A motor controller for achieving quiet operation of an AC motor comprising in combination
   a pair of lines adapted to be energized by one phase voltage of a three phase power supply;
   first and second controlled rectifiers connected in series across said lines,
   said first and second rectifiers being poled in one direction;
   third and fourth controlled rectifiers connected in series across said lines,
   said third and fourth rectifiers being poled in an opposite direction;
   a center-tapped autotransformer connected between the junction of said first and second rectifiers and the junction of said fourth and third rectifiers;
   means for connecting a phase winding of said motor between said center-tap and one of said lines; and
   means for selectively gating said first, second, third and fourth rectifiers "on" in a sequence such that said winding is energized with a multiplicity of pulses during each half cycle of the phase voltage present across said lines.

2. In an arrangement as defined in claim 1 wherein said sequence is such that a short-circuit is established across said winding in the interval between pulses.

3. In an arrangement as defined in claim 1
   a resistor and commutating capacitor;
   fifth and sixth controlled rectifiers connected in parallel with said fifth rectifier being poled in the same direction as said first rectifier and said sixth rectifier being poled in the same direction as said fourth rectifier,
   said resistor, capacitor and parallel combination of rectifiers being connected in series between said junctions.

4. In an arrangement as defined in claim 3 wherein said sequence is such that said first and fifth rectifiers are gated "on" at the same time and said fourth and sixth rectifiers are gated "on" at the same time.

5. In an arrangement as defined in claim 3 wherein said sequence is such that said third and fifth rectifiers are gated "on" at the same time, which time is different than that at which said first and fifth rectifiers are gated "on".

6. In an arrangement as defined in claim 3 wherein said second and sixth rectifiers are gated "on" at the same time, which time is different than that at which said fourth and sixth rectifiers are gated "on".

7. In an arrangement as defined in claim 1 wherein said means for gating said rectifiers includes a polarity detector for indicating the sign of said phase voltage.

8. In an arrangement as defined in claim 7 wherein said means for gating said controlled rectifiers also includes current sensing devices associated with said rectifiers for providing an indication of the conducting or non-conducting status of each rectifier.

9. In an arrangement as defined in claim 1
   a processor;
   means for supplying said processor with signals indicating the polarity of said single phase voltages and the conduction status of each of said controlled rectifiers;
   a source of first timing pulses coupled to said processor;
   a source of second timing pulses which are separated by variable amounts from corresponding pulses of said first source coupled to said processor,
   said processor analyzing the signals fed thereto and directing said timing pulse as a gating signal to the various controlled rectifiers to establish said sequence.

* * * * *